(12) United States Patent
Tang

(10) Patent No.: US 8,935,265 B2
(45) Date of Patent: Jan. 13, 2015

(54) DOCUMENT JOURNALING

(75) Inventor: Ding-Yuan Tang, Pleasanton, CA (US)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 13/221,746

(22) Filed: Aug. 30, 2011

(65) Prior Publication Data

US 2013/0054636 A1 Feb. 28, 2013

(51) Int. Cl.
*G06F 7/00* (2006.01)
*G06F 17/30* (2006.01)
*G06F 17/24* (2006.01)

(52) U.S. Cl.
CPC ........ *G06F 17/30722* (2013.01); *G06F 17/241* (2013.01)
USPC ............................ 707/754; 707/755; 707/756

(58) Field of Classification Search
CPC ................................................ G06F 17/30722
USPC .......................................... 707/754, 755, 756
See application file for complete search history.

(56) References Cited

U.S. PATENT DOCUMENTS

| | | | |
|---|---|---|---|
| 2004/0093323 A1* | 5/2004 | Bluhm et al. ..................... 707/3 |
| 2004/0161150 A1* | 8/2004 | Cukierman et al. ........... 382/186 |
| 2005/0267871 A1* | 12/2005 | Marchisio et al. ................. 707/3 |
| 2007/0047847 A1* | 3/2007 | Kasatani ........................ 382/321 |
| 2008/0195931 A1* | 8/2008 | Raghupathy et al. .......... 715/230 |
| 2012/0078955 A1* | 3/2012 | Boguraev et al. ............. 707/769 |
| 2012/0166921 A1* | 6/2012 | Alexandrov et al. .......... 715/202 |
| 2013/0031455 A1* | 1/2013 | Griffiths et al. ................ 715/230 |

FOREIGN PATENT DOCUMENTS

WO      WO 0201271 A1 *  1/2002

* cited by examiner

*Primary Examiner* — Mariela Reyes
(74) *Attorney, Agent, or Firm* — LeighAnn Weiland; Veronica Weinstein

(57) ABSTRACT

A method, device and system for acquiring information related to annotations and the content of a document. Annotations are isolated from document content and are associated with portions of the content of the document. Annotations and content are used as a basis for a semantic search of a corpus of other documents. From the corpus, related information is extracted and presented or made available along side of or with the original content and annotations of the document. Each version of a document is stored and made accessible. Any of the versions of a document, with or without a current set of annotations, may be distributed to others for further review and annotation. Annotations are protected and associated with a level of privilege or rights. Annotations are trackable over time and location and are associated with a particular annotator.

30 Claims, 6 Drawing Sheets

DOCUMENT JOURNALING

BACKGROUND OF THE INVENTION

1. Field

The present disclosure is in the field of connecting and associating information with other information. In particular, it relates to methods, systems and devices for capturing and correlating annotations or other information with information originally contained in (or printed on) documents. Correlating may be done through semantic analysis and other techniques and may involve using a time and/or date associated with each bit of information during the process of association. Annotations or other information may be in the form of handprinted, hand-written, and printed characters, and in any other form such as a video, audio or other format.

2. Related Art

Often, documents are distributed to others in business, government, education and other settings. People in turn read the documents, mark them up, annotate them, comment upon them, etc. The additional markings, annotations, comments, etc. are often lost. Annotated documents end up thrown in garbage cans, shredded, left in conference rooms, stacked on desks, dumped in file cabinets or shoved into shelves—never to see again the light of day. Even if these documents are scanned, photographed or otherwise captured or preserved, the annotations are lost from access except as someone—page by page—revisits the documents and reads the annotations.

Accordingly, companies, institutions, universities, doctor offices and individuals lose valuable information. At best, some of the annotations are transcribed and end up in email messages, meeting summaries, patient records, proposed laws, study aids, etc. In these cases, vast amounts of effort and time are wasted in recapturing (re-typing, re-wording, re-working) what was already done.

The present invention solves these and other drawbacks and problems in the art.

SUMMARY

Document journaling as described herein involves methods, devices and systems for acquiring and presenting information related to annotations and the content of any given document. For any document, new annotations are isolated from previous and original document content. Annotations may be placed on layers separate from layers containing previous and original content of a document. Annotations and content are used as a basis for various semantic searches and analyses. A semantic search may be made across all or a portion of a corpus of documents or other computer files, data, information, etc.

From the corpus, related information is extracted and presented or made available along side the original document content and document annotations. Each version of a document is stored and made accessible on a network accessible device. Any of the versions of a document, with or without a current set of annotations, may be distributed to others for further review and annotation. Annotations are protected and associated with a user, or a level of privilege or rights, or both a user and a level of privilege or rights. Annotations are associated with a time and/or date. Annotations are trackable and are associated with a particular annotator, timestamp, geolocation identifier, etc.

Document journaling may be used in conjunction with a tabletop device or a kiosk. Such a device includes such features as scanning, recognizing, printing, recording and displaying of content and information.

Audio recordings may be transcribed and made a layer of annotations and associated with one or more portions of the content of the original document, based in part upon a semantic analysis of the transcript of the audio recording and a semantic analysis of the content of the document. Portions of audio recordings may also be matched to a document according to a time, date, timestamp, location, geolocation identifier, or sequence relative to one or more annotations or annotators or other identifiable characteristic.

Visual recordings may be recorded and made available in association with portions of a document according to the content of the visual recordings or according to a time, date, timestamp, location, geolocation identifier, or sequence relative to one or more annotations or annotators or other identifiable characteristic.

Handwritten annotations may be made on uniquely identifiable copies of a document. Scanning and recognition of annotated copies of the uniquely identifiable copies facilitates the capture of the annotations for further use in the system.

This Summary introduces a selection of concepts and aspects in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter, as well as a preferred mode of use, are best understood by reference to the following Detailed Description of illustrative embodiments and implementations when read in conjunction with the accompanying drawings.

DETAILED DESCRIPTION

While the invention is described below with respect to one or more exemplary or preferred embodiments and implementations, other embodiments and implementations are possible. The concepts disclosed herein apply equally to other systems, devices and methods for capturing and placing or displaying information with other related information—no matter the source or mode of recording of information.

Throughout the description, information is found in a variety of forms. For convenience, the various forms are divided into two conceptual groups. A first group is "source information"—information, data, text, pictures, video, slides, etc. that is initially present in a document, source file, etc. The second group is "captured information"—information that is added to or associated with the source information. Captured information may be acquired by processing a physical informational embodiment (e.g., passing a paper document through a scanner) and/or by processing an electronic informational embodiment (e.g., performing optical character recognition (OCR) on an electronic image of a paper document, capturing handwriting on a touchscreen, recording voice through use of a microphone). Captured information may also be acquired by processing ambient or environmental information such as contemporaneously recorded voices, music, video, pictures, geolocation information, etc.

Figure 1:
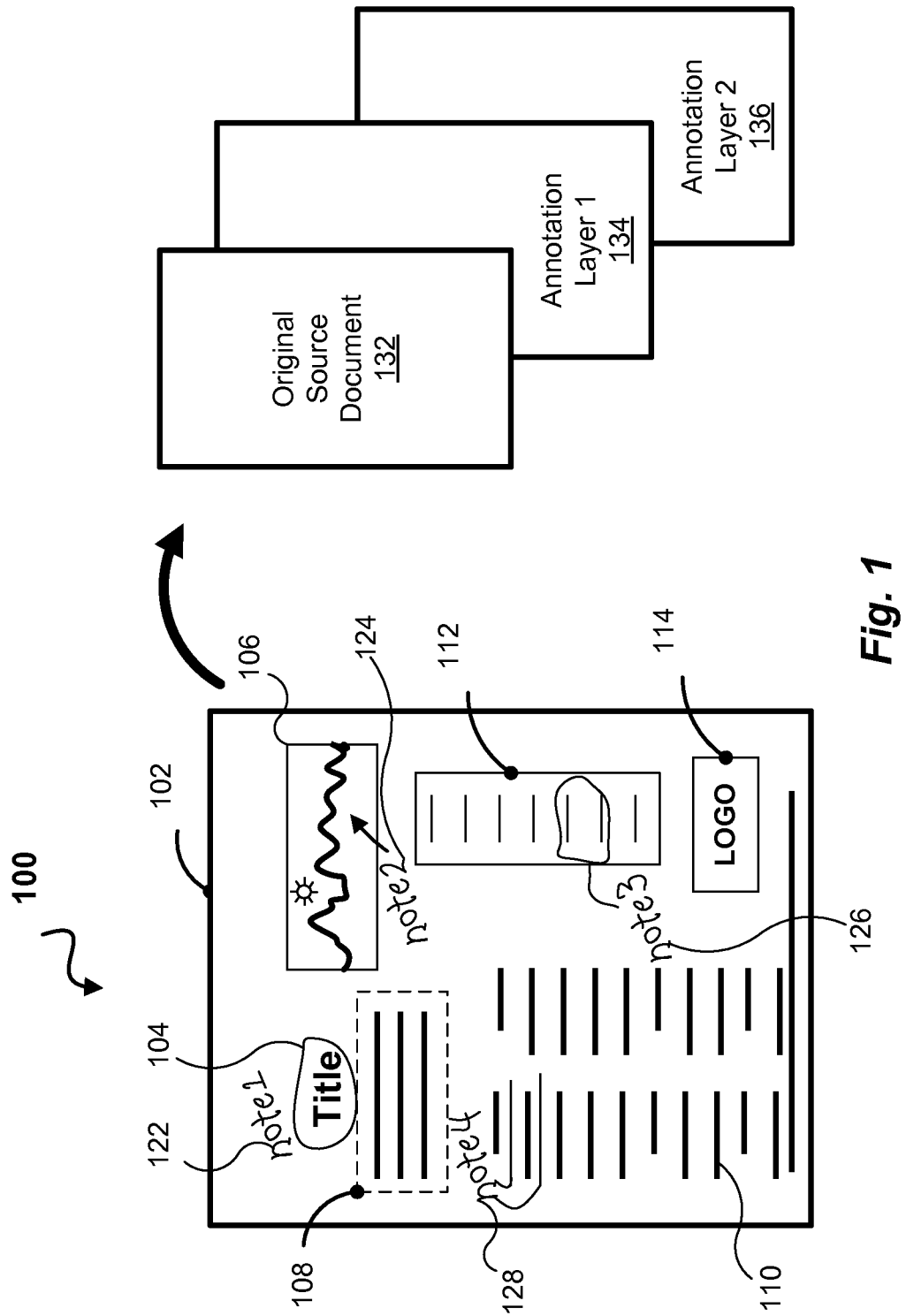
FIG. 1 is an illustration of an exemplary annotated document and separation thereof into a source document and annotation layers.

FIG. 1 shows an exemplary source document 100—an original version of a document having source information. With reference to FIG. 1, the source document 100 comprises, for example, a medium or background 102, titles 104, pictures 106, paragraphs of text 108, columns of text 110, boxes or separated regions of text 112, and logos and other stylized elements 114. As illustrated in FIG. 1, the source information has been generated by electronic means (e.g., software, application(s), printer). A source document 100 may also be generated by hand, by voice recording, etc. Accordingly, a source document may be any source of information.

FIG. 1 also shows that several annotations 122, 124, 126, 128 have been manually added—presumably made by hand with a marker or pen or added electronically through a touchscreen interface, drawing tool, annotation software, etc. The annotations 122, 124, 126, 128 are made in reference to one or more features of the source document 100 such as the background 102, titles 104, pictures 106, paragraphs of text 108, columns of text 110, boxes or separated regions of text 112, and logos and other stylized elements 114. Annotations may also be additions or deletions from one or more document features 102, 104, 106, 108, 110, 112 and 114.

Annotations may include connective elements such as arrows, underlines, bubbles, and other types of markings that identify portions of source information or other portions of annotations. The connective elements may be used in addition to semantic analysis to connect or associate annotations with source information.

In FIG. 1, a user (not shown) has available a copy of the source document 100 without annotations (an original source document 132). The source document 100 without annotations may also be available to the system for use in processing and analysis. Although the source document 100 is shown as a first page of a paper-like document, the source document may be in any form and may be physical or in an electrical form. The source document 100 may be a Web page, blog post, short message, voice message, or any other form or container of information such as a sound recording or video recording.

In an exemplary implementation, after annotations are made on the source document 100, an electronic copy of the source document 100 (and any added annotations) is processed. Processing includes separating the elements of the source document from the annotations 122, 124, 126, 128. The process of separating may be done with any one or more known methods. In a first processing, one or more annotation layers are created. In an exemplary implementation, and for sake of simplicity of description, a first annotation layer 134 is created upon a first capture and analysis of the source document 100. The first annotation layer 134 includes all of the annotations 122, 124, 126, 128 made on the original source document 132 by a first annotator (not shown), since as presumed for sake of simplicity in reference to FIG. 1, the annotations 122, 124, 126 and 128 are made by a single user or annotator.

In a subsequent or second processing of a same original source document 132 with annotations from a second user or annotator (not shown), a second or subsequent annotation layer 136 is created, and so on. Alternatively, a subsequent or second processing may be done on a source document 100 that has been annotated first, by a first annotator, and second by a second annotator. Annotations made by a first annotator may be distinguished in any of a variety of ways from annotations made by a second annotator. A clean source document 132 may be created or captured before annotations are made. Alternatively, an annotated document may be separated into an "original" source document 132 and annotation layers 134, 136 when the annotated document is processed and (made into an electronic version if necessary). In a preferred implementation, the system has access to an electronic copy of the clean source document 132 and uses the clean source document 132 to process the annotated source document 100. Annotations are found by subtracting the original source document 100 from the annotated source document 100.

Each time that a user annotates a version of the source document 132, and an annotated version of the document is processed, a timestamp is recorded and, optionally, an analysis made. Each annotator or user may be associated with or have attributes such as: department, position, group, level of access, level of privacy, company, preferred language, etc. When a source document and annotations are shown, a viewer (user) may choose whether to see certain annotations based on one or more of these attributes. For example, if a viewer does not wish to see the annotations made by members of the legal department, but only those from the sales department, he may do so.

Figure 2:
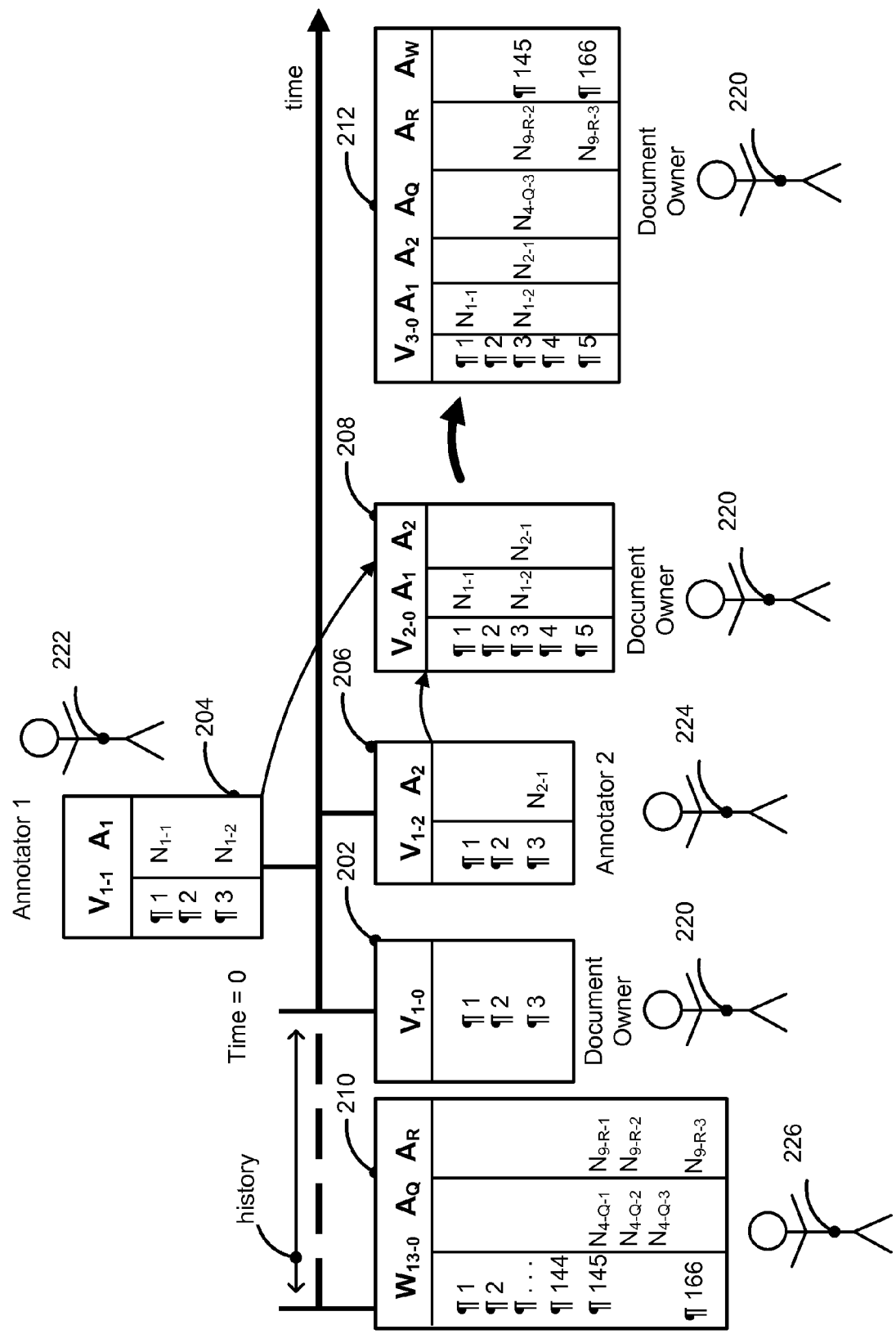
FIG. 2 is a timeline showing an annotated document and its evolution in time.

FIG. 2 is a timeline showing a conceptualized annotated document along a beginning portion of its lifecycle 200. With reference to FIG. 2, an originator, author or owner 220 has created a first version or original version of a document 202 (hereinafter "$V_{1-0}$ document" where the number "1" refers to version of the document and the number "0" refers to the owner). The $V_{1-0}$ document is free of annotations. The $V_{1-0}$ document has been created with 3 paragraphs, $P_1$, $P_2$ and $P_3$. After its initial creation, the $V_{1-0}$ document 202 is distributed to two others, a first annotator 222 and a second annotator 224.

The first annotator 222 belongs to a same department of the owner 220; the second annotator 224 does not. A first annotator 222 makes two annotations $N_{1-1}$ and $N_{1-2}$ on the document and thereby forms a first annotated version of the document 204 (hereinafter "$V_{1-1}$ document"). The annotations $N_{1-1}$ and $N_{1-2}$ may include connective elements, but for sake of simplicity in describing FIG. 2, are not mentioned each time in association with $N_{1-1}$ or any of the other annotations. The $V_{1-1}$ document happens to be created next chronologically along the timeline 200 but may be created at any time along the timeline 200 after the creation of the $V_{1-0}$ document. When processed by a device, software or other system element(s) (not shown), it is determined that the $V_{1-1}$ document has a first annotation $N_{1-1}$ associated with the first paragraph $P_1$ and a second annotation $N_{1-2}$ associated with the third paragraph $P_3$.

The second annotator 224 makes a single annotation $N_{2-1}$ on the $V_{1-0}$ document and thereby forms a second annotated document 206 (hereinafter "$V_{1-2}$ document"). The $V_{1-2}$ document happens to be created subsequent to the $V_{1-1}$ document along the timeline 200, after the annotations made by the first annotator 222, but the $V_{1-2}$ document may be created at any time along the timeline 200 after the creation of the $V_{1-0}$ document. When processed, it is determined that the $V_{1-2}$ document has a first annotation $N_{2-1}$ associated with the third paragraph $P_3$.

At a future point in time, once the first annotator 222 and the second annotator 224 are finished with their respective annotations, and the system gains access to the $V_{1-1}$ document and the $V_{1-2}$ document, the document owner 220 may desire to view, acquire or use the annotations from the $V_{1-1}$ document and the $V_{1-2}$ document. For the sake of simplicity of description, the annotations may be considered merged with the original $V_{1-0}$ document and thereby form a new version or second version of this "document" 208, (hereinafter "$V_{2-0}$ document"). The $V_{2-0}$ document 208 has the annotations from the first annotator 222 and the second annotator 224. In practice, these annotations may be stored in a network accessible location in the system (not shown) or may be stored or recorded in a respective annotation layer in a same file as the content of the original $V_{1-0}$ document. The document owner 220 has the option to view the annotations from the first annotator 222, the annotations from the second annotator 224, or the annotations from both the first annotator 222 and second annotator 224. This option may be provided through a software interface control, etc.

In an alternative implementation, assuming for a moment that the second annotator 224 belongs to a group or department that is more restrictive than the group to which the document owner 220 belongs (e.g., upper management), the document owner 220 may not have permission to view the annotation $N_{2-1}$ from the second annotator 224, but such annotation $N_{2-1}$ is still embedded in, stored with, associated with or associatable with the content from the $V_{1-0}$ document 202. The annotation $N_{2-1}$ may have a separate encryption scheme or encoding to prevent the document owner 220 from accessing the annotation $N_{2-1}$. At this point, after reviewing, using or consuming the annotations, the document owner 220 adds paragraphs $P_4$ and $P_5$ to the $V_{2-0}$ document.

At this point in time, the $V_{2-0}$ document is further processed by a semantic analysis as shown by the arrow. The semantic analysis may include such techniques as those known to those of skill in the art and/or such techniques disclosed in U.S. patent application Ser. Nos. 13/173,369 and 13/173,649; all the material of which is herein incorporated by reference to the extent not inconsistent with this disclosure. The semantic analysis may include an analysis of documents in a same language as that of the $V_{2-0}$ document. Alternatively, the semantic analysis may include an analysis of documents in one or more other languages as that of the $V_{2-0}$ document. The annotations of either or both of the first annotator 222 and the second annotator 224 may be in a same or a different language than that of the $V_{1-0}$ document. A semantic analysis of the $V_{2-0}$ document yields for purposes of illustration a $V_{3-0}$ document.

The semantic analysis includes processing each of the characters, words, sentences, paragraphs and so forth (the "content") of the $V_{2-0}$ document. Further, the semantic analysis includes processing each of the characters, words, sentences, paragraphs and so forth of the annotations $N_{1-1}$, $N_{1-2}$ from the first annotator 222 and $N_{2-1}$ from the second annotator 224. The processing occurs whether or not the document owner 220 has access to or a proper privilege to view the annotations.

The semantic analysis uses the content (and content of the annotations) of the $V_{2-0}$ document to access other historical and available information derived from other documents and other sources such as the historical document 210 (hereinafter "$W_{13-0}$ document") shown in FIG. 2. With reference to FIG. 2, for purpose of illustration, a single historical document 210 is shown. However, any number of historical documents may be a source of historical information. Further, the $W_{13-0}$ document is shown in a state at a certain historical time in the past relative to the creation date of the $V_{1-0}$ document—such as two months prior to the time of origin of the $V_{1-0}$ document. Such is for the sake of illustration only.

A historical document as used herein is any information, data or document that is in existence at the time that semantic analysis is performed. Semantic analysis may be performed upon documents within an organization, within a collection of resources, documents or data available within an organization, or may be an analysis across any variety of sources including those derived from traditional searching such as from key word searching through a commercial Internet search engine or a search engine operable within an organization, or through a free or commercial service.

The $W_{13-0}$ document is associated with a second document owner 226. The $W_{13-0}$ document includes at least 166 paragraphs of information. The $W_{13-0}$ document has been through, for example, 12 iterations of changes (thereby making the index 13) including changes made in response to a semantic analysis as described herein. The $W_{13-0}$ document includes or has associated with it annotations from a plurality of annotators including those from annotator Q and annotator R (as shown). With reference to FIG. 2, the annotations from annotator Q include, for example, annotations $N_{4-Q-1}$, $N_{4-Q-2}$, and $N_{4-Q-3}$ associated with paragraph 145 of the $W_{13-0}$ document. These annotations were found, through semantic analysis (as performed in association with the $V_{2-0}$ document), to be relevant to the content of the $V_{2-0}$ document, one or more annotations associated with the $V_{2-0}$ document, or to a combination of the content of the $V_{2-0}$ document and one or more annotations associated with the $V_{2-0}$ document. The $N_{4-Q-}$ annotations were made in reference to version 3 or third iteration of the W historical document (hence the "4" in $N_{4-Q-}$ annotations)—however, version information may or may not be used in the semantic analysis. The use of such information may depend on the desire and choice made by the first document owner 220 when selecting options for semantic analysis of the $V_{2-0}$ document.

The annotations from annotator R include annotations $N_{9-R-1}$ and $N_{9-R-2}$ associated with paragraph 145, and annotation $N_{9-R-3}$ associated with paragraph 166 of the $W_{13-0}$ document. These annotations were found, through semantic analysis, to be relevant to the content of the $V_{2-0}$ document, one or more annotations associated with the $V_{2-0}$ document, or to a combination of the content of the $V_{2-0}$ document and one or more annotations associated with the $V_{2-0}$ document. The $N_{9-R}$ annotations were made in reference to version 8 or eighth iteration of the W historical document (hence the "9" in $N_{9-R-}$ annotations)—however, this version information may or may not be used in the semantic analysis (as performed in association with the $V_{2-0}$ document). The use of such information may depend on the desire and choice made by the first document owner 220 when selecting options for semantic analysis of the $V_{2-0}$ document.

With reference to FIG. 2 and the timeline 200, the semantic analysis, starting from the $V_{2-0}$ document, has determined that annotations $N_{9-R-1}$, $N_{9-R-2}$ and $N_{9-R-3}$, and annotations $N_{4-Q-1}$, $N_{4-Q-2}$, and $N_{4-Q-3}$ of the $W_{13-0}$ document are relevant to the $V_{2-0}$ document. In particular, the semantic analysis determined, for example, that the content from one or more of: (1) paragraphs 145 and 166 of the $W_{13-0}$ document; (2) annotations $N_{4-Q-1}$, $N_{4-Q-2}$, and $N_{4-Q-3}$ of the $W_{13-0}$ document; and (3) annotations $N_{9-R-1}$, $N_{9-R-2}$ and $N_{9-R-3}$ of the $W_{13-0}$ document; is relevant to content from one or more of: (1) paragraphs 3 and 5 of the $V_{2-0}$ document; (2) annotation $N_{1-2}$ of the $V_{2-0}$ document; and (3) annotation $N_{2-1}$ of the $V_{2-0}$ document. Further, the semantic analysis determined, according to a ranking (such as based on a per-paragraph basis or a per-annotation basis), that the content from annotations $N_{4-Q-3}$ and $N_{9-R-2}$ of the $W_{13-0}$ document is strongly relevant to content from one or more of: (1) paragraph 3 of the $V_{2-0}$ document; (2) annotation $N_{1-2}$ of the $V_{2-0}$ document; and (3) annotation $N_{2-1}$ of the $V_{2-0}$ document. The semantic analysis also determined, according to a ranking (such as based on a per-paragraph basis or a per-annotation basis), that the content from annotation $N_{9-R-3}$ of the $W_{13-0}$ document is strongly relevant to content from paragraph 5 of the $V_{2-0}$ document.

After the semantic analysis has been performed on the $V_{2-0}$ document, a third version of the original document 212 (hereinafter "$V_{3-0}$ document") may be made available for viewing by the document owner 220. The $V_{3-0}$ document may be said to be created with some or all of the information or content identified by the semantic analysis in addition to the content or information from or associated with the $V_{2-0}$ document. For example, information or content from one or more annotators and/or one or more other document owners may be placed on another layer associated, stored or included with the $V_{2-0}$ document. With reference to FIG. 2, the $V_{3-0}$ document is shown with or includes paragraphs 1-5, annotations $N_{1-1}$; $N_{1-2}$; $N_{2-1}$; $N_{4-Q-3}$; $N_{9-R-2}$; $N_{9-R-3}$, and paragraphs 145 and 166. Each of the sets of annotations may be shown or identified independently of one another. For example, each annotation of a set of annotations from a particular annotator may be shown in a particular color distinct from the colors of the other annotations from other annotators. Further, annotations may be collapsed or presented as a traditional addition or annotation to original content of a document. For example, annotations $N_{1-1}$, $N_{1-2}$, $N_{2-1}$; $N_{4-Q-3}$; $N_{9-R-2}$; $N_{9-R-3}$, and paragraphs 145 and 166, may appear in the $V_{3-0}$ document as footnotes, endnotes, reviewer bubbles and the like. The $V_{3-0}$ document (or portions of its various contents) may be presented in a Web page or through a browser or through another networked means. Portions of the $V_{3-0}$ document may be presented all at once or may be presented piecewise. The expression or format is selectable by a viewer of the $V_{3-0}$ document or by the creator of the $V_{3-0}$ document. The file format of the $V_{3-0}$ document may be a unique file format or may be any one of conventionally used file formats such as portable document format (PDF), rich text format (RTF), and extensible markup language (XML).

Prior to this semantic analysis and these techniques, a document owner 220 would not know of the existence of or gain access to content and information from at least the annotations made by annotator Q, the annotations made by annotator R, and the $W_{13-0}$ document. Further, prior to this semantic analysis and these techniques, a document owner 220 would not be able to identify annotator Q, annotator R and the second document owner 226 as persons with information relevant to the information in the $V_{2-0}$ document. Further still, prior to this semantic analysis and these techniques, a document owner 220 would not be able to identify departments, working groups, companies, countries, etc. associated with the respective annotator Q, annotator R and the second document owner 226 as entities that would likely have interest in and actual information relevant to the information in the $V_{2-0}$ document. Armed with this information, a first document owner 220 would be able to perhaps contact and discuss with one or more of annotator Q, annotator R and the second document owner 226 (and their related departments, schools, companies, countries, etc.) relevant and related topics.

In this way, for example, a corporation could identify actors and information that may be relevant to a particular project, action product, work or service. In another example, a first congressman drafting a first soon-to-be proposed bill could identify another congressman who previously worked on a provision of a second formerly proposed bill, or could identify an existing bill, law or regulation that may be impacted by, in conflict with or related to the first soon-to-be proposed bill.

Figure 3:
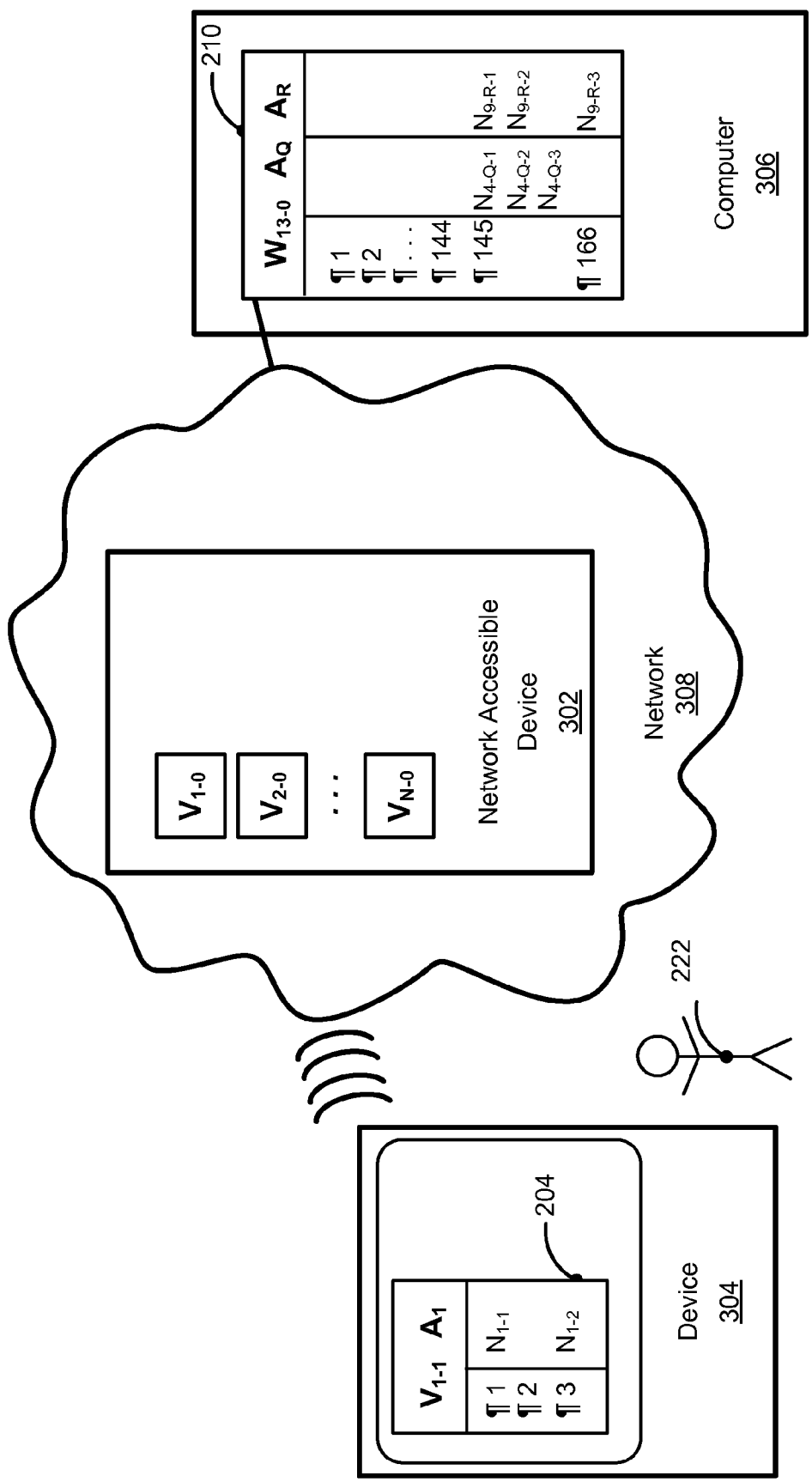
FIG. 3 illustrates an environment in which two annotated documents are stored in different locations in a network and where versions of an annotated document are stored in a network accessible device.

FIG. 3 illustrates an exemplary environment 300 in which to practice the invention. With reference to FIG. 3, the environment 300 includes a network-accessible device 302. The network-accessible device 302 may include one or more memories, one or more storage components, one or more processors, one or more input devices, one or more output devices, one or more network components, one or more power supplies, and one or more display devices. A storage component of the network-accessible device 302 stores a plurality of versions of a first annotatable document ($V_{1-0}$, $V_{2-0}$, $V_{N-0}$, etc. such as shown in FIG. 2) created by a first document owner (not shown). These versions of the annotatable document are accessible (searchable, readable, writable, etc.) by components of the environment 300. A first annotator 222 uses a tablet computer 304 to make annotations on an electronic copy of the first annotatable $V_{1-0}$ document. The first annotator 222 creates, in effect, a $V_{1-1}$ document with annotations $N_{1-1}$ and $N_{1-2}$ associated with ¶1 and ¶3, respectively. When the first annotator 222 is finished creating the annotations, a software component (not shown) operating on the tablet computer 304 wirelessly makes available, through components of the system 300, one or more of the following: annotations $N_{1-1}$ and $N_{1-2}$, one or more layers of a document with the annotations $N_{1-1}$ and $N_{1-2}$, or a version $V_{1-1}$ document of the original $V_{1-0}$ that includes one or more layers of a document with the annotations $N_{1-1}$ and $N_{1-2}$. Alternatively, the tablet computer 304 may send one of these to the network-accessible device 302 for aggregation and/or storage. Similarly, a detectable version of the $W_{13-0}$ document 210 (or its contents) is made available to or within the environment 300. In one example, as shown in FIG. 3, the $W_{13-0}$ document 210 is stored on an accessible computer device 306 that is in electronic communication with the network-accessible device 302. A semantic analysis of an annotated version of the original document, for example, a $V_{N-0}$ document, may occur partially or fully on one or more of the components of the system 300 such as the network-accessible device 302, the tablet computer 304 and the accessible computer device 306. Thus, a semantic software, program or other logic may operate on one or more of these components.

Figure 4:
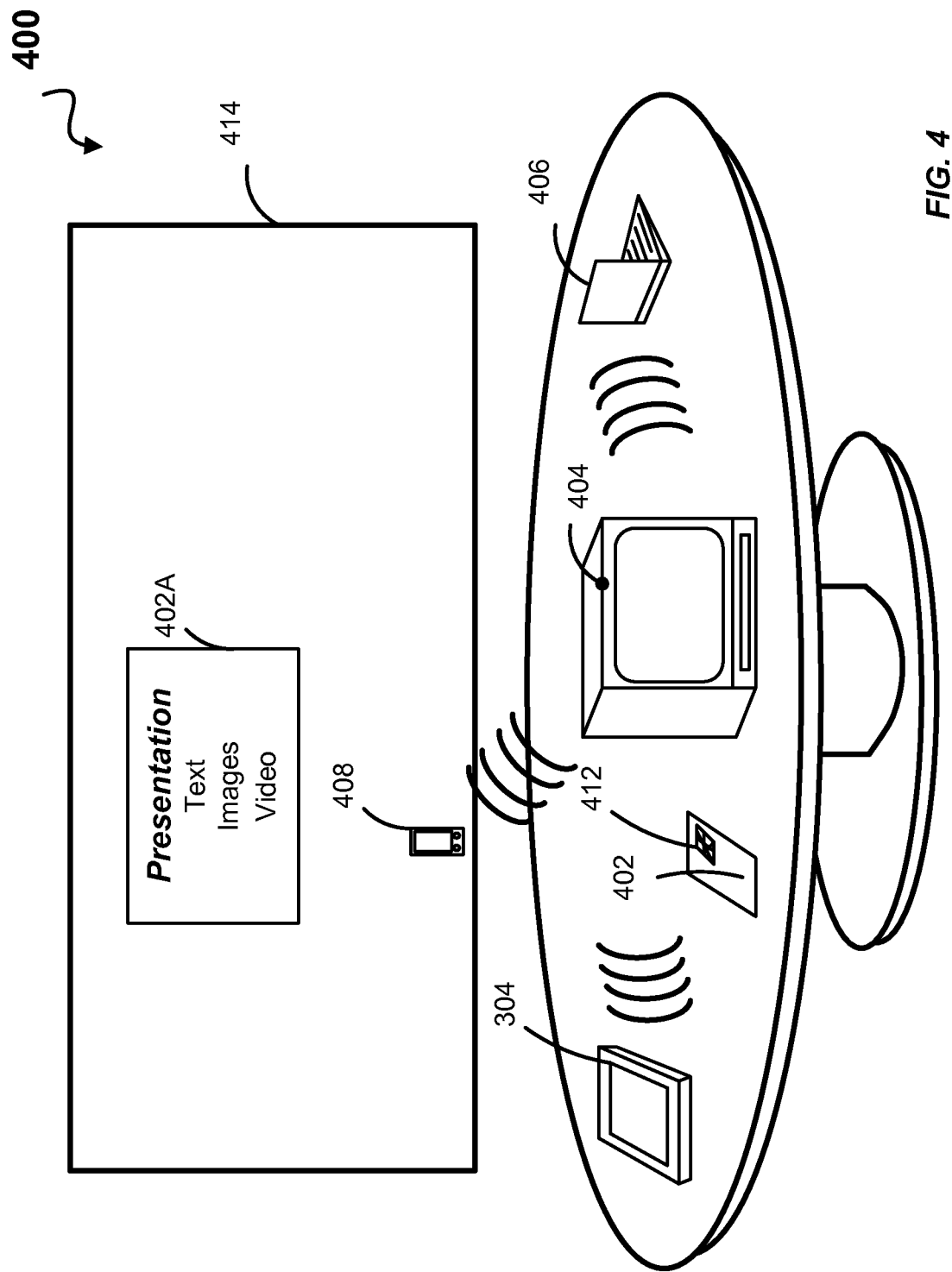
FIG. 4 illustrates an exemplary scenario and devices capable of performing one or more of the teachings described herein.

FIG. 4 illustrates an exemplary scenario 400, associated environment and device(s) capable of performing one or more of the teachings described herein. With reference to FIG. 4, an exemplary scenario 400 involves a meeting wherein each of a plurality of attendees (not shown) review the contents of a source document 402 or review a source presentation 402A and (preferably) provide feedback. The source document 402 and source presentation 402A may each include text, images, video and the like. The source presentation 402A may be used in association with an electronic or interactive whiteboard 414.

In this exemplary scenario, an attendee provides annotations on a paper copy or via an electronic copy of the source document 402. A tabletop device 404 is a device that includes a variety of components to facilitate distribution of paper copies and electronic copies of the source document 402 such as in the setting of a meeting. For example, the tabletop device 404 includes a printer so as to provide on demand a paper copy of the source document 402. In a preferred implementation, each paper copy of the source document 402 includes a unique or semi-unique scannable identifier 412 tying a particular copy of the source document 402 to a particular attendee. A scannable identifier may be a barcode, a one- or two-dimensional code, a QR code, or any other code, and may be in whole or part a human-readable code or identifier.

For attendees that have access to an electronic device at the meeting, the tabletop device 404 distributes (or causes to be distributed) electronically a copy of the source document 402 to each of the devices, preferably when the devices come within a range of the tabletop device 404 at or near a start time for the meeting. Alternatively, a document owner (and perhaps meeting organizer) distributes a copy of the source document 402 to an account associated with each of the attendees thereby allowing attendees to gain access to an electronic copy of the source document 402. With reference to FIG. 4, distribution may be made to, for example, a tablet computer 304, a laptop computer 406, and a cellular telephone or smartphone 408.

During a meeting, attendees preferably make annotations on a copy of the source document 402. Alternatively, attendees make annotations in a separate location or document to be associated later with a copy of the source document 402. During a meeting, the tabletop device 404 may be caused to record and transcribe the voices of meeting participants. The transcribed recordings may be treated as other annotations and may be associated with one or more portions of the source document 402 through semantic analysis or explicit reference to a particular portion of the source document 402. Further, the tabletop device 404 may record video or other data or information associated with use of any presentation made at the meeting such as a source presentation 402A and the use of the whiteboard 414. The tabletop device 404 (or other component of the system) may use radio frequency identification (RFID), a biometric, voice recognition, location-based information of a personally-associatable device (e.g. smartphone), or other means to identify who is speaking or who is presenting a source presentation 402A or who is "annotating" or working at the whiteboard 414. For example, when annotator 2 is in the meeting and during the meeting gets out of a chair and approaches the whiteboard 414 and makes a series of comments in regard to a portion of the source presentation 402A, the tabletop device 404 may record a change in a location of a smartphone worn by annotator 2 or may detect a change in location of the origin of the voice of annotator 2, and the tabletop device 404 may identify that annotator 2 is making a comment in regard to a particular portion of the source presentation 402A. During such action by annotator 2, the tabletop device 404 records timestamps and voices, and captures images or video of gestures and annotations made on or in association with the whiteboard 414 along with an identification for each portion of the source presentation 402A that is being addressed by annotator 2.

Portions of the recordings (audio, video, etc.) may be associated with a timestamp; the respective timestamps may be used in associating portions of recordings with portions of the source document 402 or portions of the source presentation 402A. The timestamps and portions of the recordings may be used as described herein in reference to FIG. 2. For example, portions of recordings may be associated with particular portions of the source document 402 upon performing an analysis of a particular version or portion of the source document 402. The associations may be made in approximate real-time as a meeting or annotation session progresses, or after a meeting at which recordings are made. When associations are made in approximate real-time during a meeting, the annotations from each of the various annotators are pushed or distributed to each electronic copy of the source document 402 on the various devices of the annotators. Annotations that originate from audio recordings may be made available in audio format or may be transcribed and presented or associated with a particular portion of a source document in a text-based, transcribed form. The annotation may merely be identification of the annotator, or may be some or all of a transcription of the portion of audio recording.

The annotations may take the form of a color coded or color intensity map whereby various portions of a resulting source document are highlighted or identified in different colors depending on a number of annotations made in reference to a particular portion of an original version of the source document. For example, when 13 of 22 meeting participants make annotations in reference to paragraph 3 of a source document, paragraph 3 may be shown (after annotations have been collected and processed) with a red highlighting, while most of the remainder of the source document is shown in white. Continuing the example, when only 4 of 22 meeting participants make annotations in reference to paragraph 16 of the source document, paragraph 16 is shown with a yellow highlighting conveying that perhaps less attention should be paid to paragraph 16 relative to paragraph 3. In a further example, semantic analysis may be performed on all annotations made by the 22 meeting participants. Color-coding of a resulting document may be done according to positive and negative sentiments of the annotations. For example, supposing that 7 of 9 annotations of paragraph 21 convey a positive sentiment (e.g., "good," "right direction here"), paragraph 21 may be indicated in a first color while a paragraph with 3 of 4 annotations conveying a neutral or negative sentiment (e.g., "not sure," "don't include this part") may be indicated in a second color. In this way, through principles of surveying, semantic analysis and recognition, a resulting source document is presented in an easily understood format, with or without text annotations.

Like the paper copies, each electronic copy of the source document 402 may include a unique or semi-unique scannable identifier tying the electronic copy of the source document 402 to a particular attendee or electronic account associated with an attendee (e.g., an email account, a document repository tied to a particular user ID and password). Alternatively, electronic copies of the source document 402 may be identified by a unique or semi-unique code or other identifier embedded in the electronic copy of the source document 402. In yet another alternative, electronic copies of the source document 402 may be identified by an electronic account associated with a particular attendee. Attendance at the meeting may be recorded based on which document identifiers are scanned and detected when the copies of the source document 402 are processed.

The tabletop device 404 includes a scanner or camera to capture an original version of the source document 402 and to facilitate digitization or creation on demand of an electronic copy of an annotated version of the source document 402 for each of the attendees using paper. The scannable identifier 412 may or may not be human readable or human detectable, but is detectable by the tabletop device 404. The tabletop device 404 also includes components such as a projector, microphone, memory, storage, input and output components, and the like.

At some point before, during or after the meeting, annotations are captured by the tabletop device 404 by having the tabletop device 404 detect, scan, identify or electronically receive a copy from each attendee a marked up copy of the source document 402, or just a copy of annotations. Reception may be done incrementally during a meeting or may be received in a batch before, during or after the meeting. Capture of annotations may be done by passing marked up paper copies through or in front of a scanning or camera component of the tabletop device 404, or by having each of the attendees send or deliver to a component of the system an electronic version of a marked up copy of the source document 402. Electronic delivery may be facilitated by one or more software applications including one or more software applications operating on the tabletop device 404 and the personal devices (e.g., the tablet computer 304, the laptop computer 406, and the cellular telephone or smartphone 408). Recognition of the annotations (e.g., handwritings, marks, printed characters) may be performed by the tabletop device 404, a respective personal device 402, 406, 408 or a combination of the tabletop device 404, a respective personal device 402, 406, 408 and/or network-accessible device or component (not shown).

Recognition may include performing optical character recognition (OCR), intelligent character recognition (ICR) and the like. Recognition is also performed on handwriting and connective elements. Handwriting, word choice, grammar, etc. from each attendee may be recognized thereby forming an annotation style or profile for each respective attendee. The annotation style or profile is updated each time a particular attendee annotates a document throughout an organization. The profile may be stored on a tabletop device 404, a respective personal device 402, 406, 408, or a network-accessible device, or a combination thereof. The annotation style or profile is used when a scannable identifier is not recognized or present on a source document 402.

Annotations

In various places herein, reference has been made to annotations being made "on" a document. Such description has been made for the sake of simplicity with respect to describing certain implementations. Herein, it is to be understood that, alternatively, annotations made be made on, in, around and for accompaniment with a document. Annotations may be made physically by available means, and may be made electronically on, in, around and for accompaniment with an electronic copy of the document Historical Information Historical information may be derived from historical documents. Historical documents may be anything in any type of recordable and accessible medium. Such historical documents may include, but are not limited to image-based and text-based documents in any format, audio files, video files, audio-visual files, information stored in a database, images stored in a database, etc. including information available in email repositories and through accessible services.

Document Owners

Herein, in various places, reference has been made to a "document owner." Such reference is made for sake of convenience only. A document owner is merely any entity that is associated with a document. It is to be understood that a document owner is merely a placeholder for someone or some entity that initially created the document or information. Further, a starting point or original document may be the product of collaboration and thus may have several "owners" or authors. Further, a document may be associated with a group, entity, person, government, class or other entity or identity. The document may said to belong to each of its authors, owners, contributors or annotators as described herein.

Geographic Tracking

In a preferred implementation, each document is trackable geographically. Each time a document is subject to annotation or markup, a location of the document is recorded. Such recording may be in the form of a device recording a geolocation identifier (e.g., a longitude and latitude, city identifier, real estate code or identifier) at which the document was accessed, annotated, printed or scanned. Printed and electronic copies of documents may include a code identifying a geographic location at which the event took place. Alternatively, each time annotations are added, saved or processed, such a geolocation identifier may be recorded. For a desktop computer, a location of a document may be an approximation based on, for example, IP address, assigned location (e.g., building 5, conference room XYZ, at company campus where a longitude and latitude is discoverable), or some other basis. For a mobile device (e.g., tablet computer, smartphone), the location of a document at markup time may be based in whole or in part upon a GPS reading or other location-based service that more accurately or more timely pinpoints the location of the device at markup time. The location may be tied to the time of markup (based on datestamp).

During viewing of a current or past version of a document, and/or annotations, viewing may be filtered based upon geolocation identifiers for each of the various bits of information. Thus, each annotation and portion of a document (e.g., sentence, paragraph, section) may have associated with it a time recording (e.g., timestamp including date) and a geolocation identifier.

Use Cases

The use of the techniques described herein may be used in a variety of settings including providing annotations on a book, contracts, expense receipts (such as for tax purposes), judicial opinions, proposed legislative bills, classroom work, school papers, research papers, and maps.

HIRING. An exemplary use case illustrates the utility of the described techniques. The use case involves the review and analysis of a resume (and corresponding candidate) for hiring for an available position at a company. In this case, several copies of a resume are distributed to selected employees ("reviewers") for feedback on the candidate associated with the resume. Each copy of the resume are annotated and returned to a human resources (HR) staff member. The HR staff member, through an electronic device, executes a semantic analysis of the source information of the resume and of the annotations made by the reviewers. Based on (1) a corpus of existing resumes associated with respective (current and former) employees at the company, (2) the content of the resume, and (3) the annotations, the semantic analysis identifies and ranks, for example: (1) a plurality of employees that likely have characteristics similar to that of the candidate, and (2) areas of interest or concern to discuss during interviews with the candidate. A semantic analysis may identify and rank other information.

For the interviews, electronic or paper copies of the resume may be distributed to each of a plurality of interviewers. Depending on the groups or departments that the interviewers belong to, a different set of annotations appear on the respective copy of the resume. For example, if a chief officer of the company receives a copy of the resume, perhaps she is authorized to have access to all of the previously made annotations. If someone from a marketing department is an interviewer, the copy of the resume only contains annotations identified as pertinent or authorized for members of the marketing department. For example, perhaps annotations related to salary are omitted on the copy of the resume distributed to the marketing interviewer.

An electronic copy of each of the copies of the resume distributed to the interviewers is saved in some fashion in the system. Annotations made by the interviewers may be made on the respective copies of the resume during time spent interviewing the candidate (or, for example, shortly thereafter). These copies of the resume are optically scanned and recognized. The annotations made by the interviewers (reflecting the observations by the interviewers) are subject to a semantic analysis. This second semantic analysis is added to the first semantic analysis. An aggregation of all annotations, voice messages, group decisions, email messages, and the like that refer to the interviewee and candidate are saved and are presentable to those with permission to access the information, in whole or in part. The collection of information about the candidate can then be used to make a determination about hiring of the candidate. In this way, the techniques described herein can enhance the use of information that is often lost or inaccessible to employees of a company. Decisions may be made faster and may be better informed than previously possible. Accordingly, companies may become more productive.

SCHOOL. Another exemplary use case further illustrates the utility of the described techniques. For example, a tabletop device is made available in a classroom. The classroom has 20 students and an electronic device for each of the students. The electronic devices are in electronic communication with the tabletop device. A teacher triggers distribution of an original source document to each of the electronic devices. The original source document includes a passage of literature. The teacher requests that each of the students make annotations on the original source document as to any portion of the passage that has an error and as to any portion of the passage that they particularly find significant or enjoyable. During the exercise, each of the students reads his respective copy of the source document and makes annotations. The teacher, perhaps through the tabletop device at his desk, watches in approximate real-time the progress of the students. The teacher could identify any student in approximate real-time who needs attention. At a desired time, the teacher triggers retrieval and aggregation of annotations from all students. The devices, the tabletop device or combination thereof perform a semantic analysis of the annotations made by the students. The teacher then triggers the tabletop device to display a color coded or other version of an annotated original document on the whiteboard for further discussion in the class. The version displayed may include some or all of the annotations made by the students, or may include an interpretation or aggregation and synthesis of the annotations made by the students. Further, the annotations from the 20 students may be combined with annotations made by other classes at the same school (but perhaps in previous years) or may be combined with annotations made by other classes across the country. An annotated resulting document may be considered a social map that composites information from all or a plurality of the students and the annotations may be broken down by sex of the student, previously measured reading ability of the student, etc.

In this use case, document journaling provides an enhanced learning experience for the students. Further, document journaling may record participation of each of the students for each activity during a day, and for each day throughout an academic year. Participation, annotations, timestamps, etc. may all be used to present a historical record for a particular student over his years of schooling and may be used to show trends, progress, etc. of the student. Further, participation, annotations, timestamps, etc. may all be used to identify trends at a school, trends in a classroom, and may help pinpoint areas for improvement of a curriculum, troublesome topics of pedagogy for a particular teacher, etc. The techniques described in reference to this use case can enhance the use of information that is often lost or inaccessible to teachers, administrators and students in a pedagogical setting.

Exemplary Method

Figure 5:
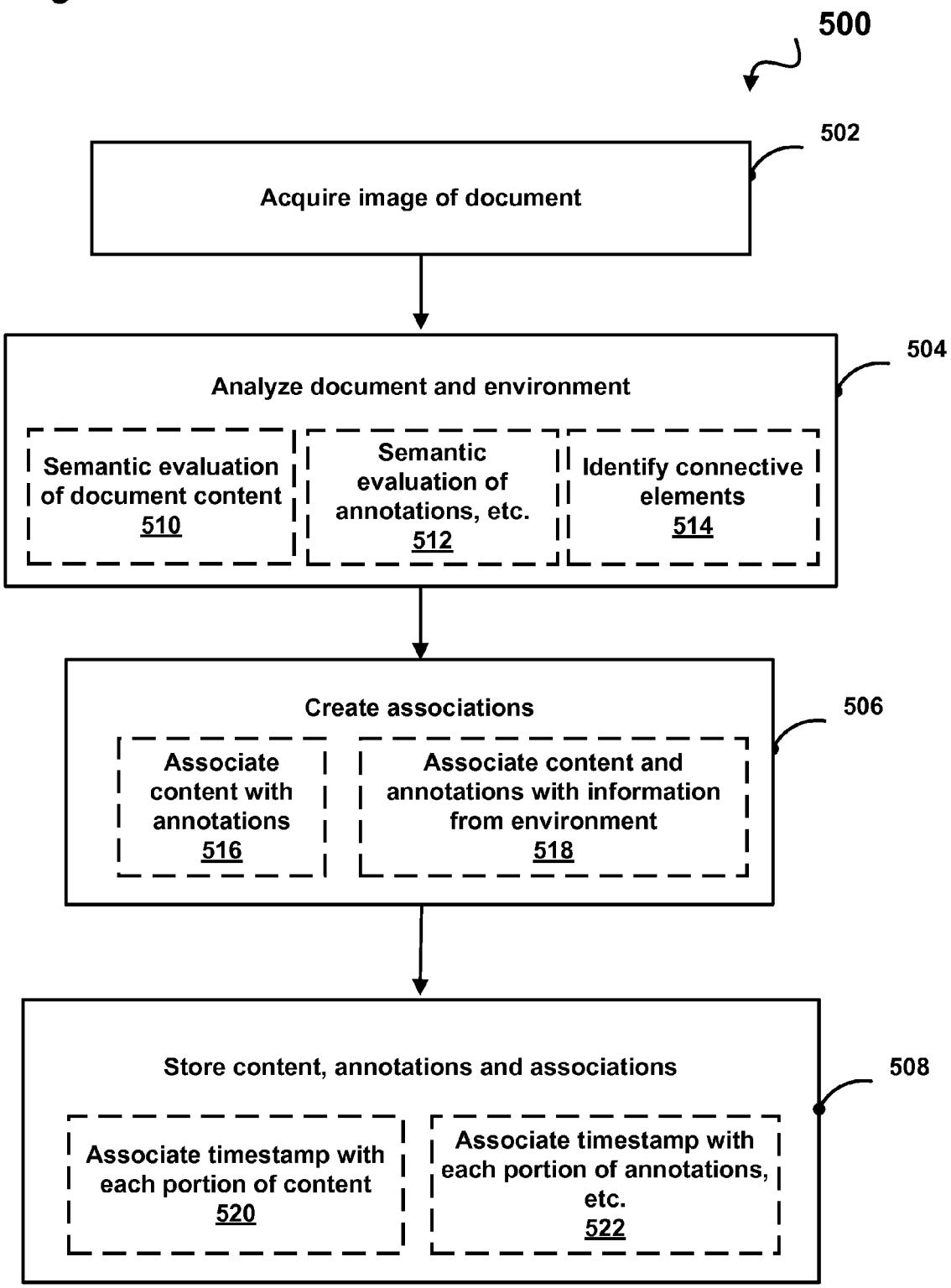
FIG. 5 is a flowchart illustrating an exemplary implementation of a method as described herein.

FIG. 5 is a flowchart illustrating an exemplary implementation of a method 500 for finding and presenting information related to the content of a document or annotations made on the document. With reference to FIG. 5, a method includes acquiring an image of a document, step 502. Acquiring an image may be done through one or more mechanisms. For example, a version of a document may be annotated electronically on a tablet computing device and transferred to or shared with another network accessible computer. For another example, a paper version of a document may be annotated with an ink pen, scanned by a sheet feeding scanning device and transferred to or shared by the sheet feeding scanning device to a network accessible computer.

After an image of a document is acquired, the document and environment are analyzed step 504. Analysis of the document includes separating annotations and any recordings made during an annotation session from the original content of the document. Analysis of the document also includes a semantic evaluation of the original content of the document, step 510. Analysis includes a semantic evaluation of any annotations on the annotated document and a semantic analysis or evaluation of sound, video or other recordings made contemporaneously during an annotation session, step 512. Voice or other audio recordings made during annotation of a document may be transcribed, and the transcription is semantically analyzed. Further, analysis of the document includes identification of any connective elements such as marks that connect annotations with particular portions of the document, step 514. A handwritten arrow such as that shown along with note 2 (124) in FIG. 1 is an example of such a connective element.

After analysis, associations are made between the original content of the document and annotations, etc., step 506. Associations may be made, for example, between a first portion of the document and other portions of the content of the document, between a first portion of the document and an annotation (step 516), between a first portion of the document and a connective element, between a first portion of the document and a portion of a transcription of a recording made contemporaneously during an annotation session (step 518), and between annotations, connective elements and portions of transcriptions of recordings.

Once one or more associations are created, document content, annotations and associations are stored, step 508. Step 508 may include associating a timestamp, time, date or other time-relevant parameter with each portion of content of the document, such as step 520. The timestamp of a document may be a time and date of creation of the original document, a time and date of last modification of the original document, a time and date of scanning of the annotated document, a time and date of sharing of the original document (such as at a meeting or by sending to annotators), etc. Further, step 508 may include associating a timestamp, time, date or other time-relevant parameter with each annotation, audio recording, video recording, picture recording, etc. or portion thereof. Step 508 may also include associating a location or information associated with a location with each annotation, audio recording, video recording, picture recording, etc.

Exemplary Hardware

Figure 6:
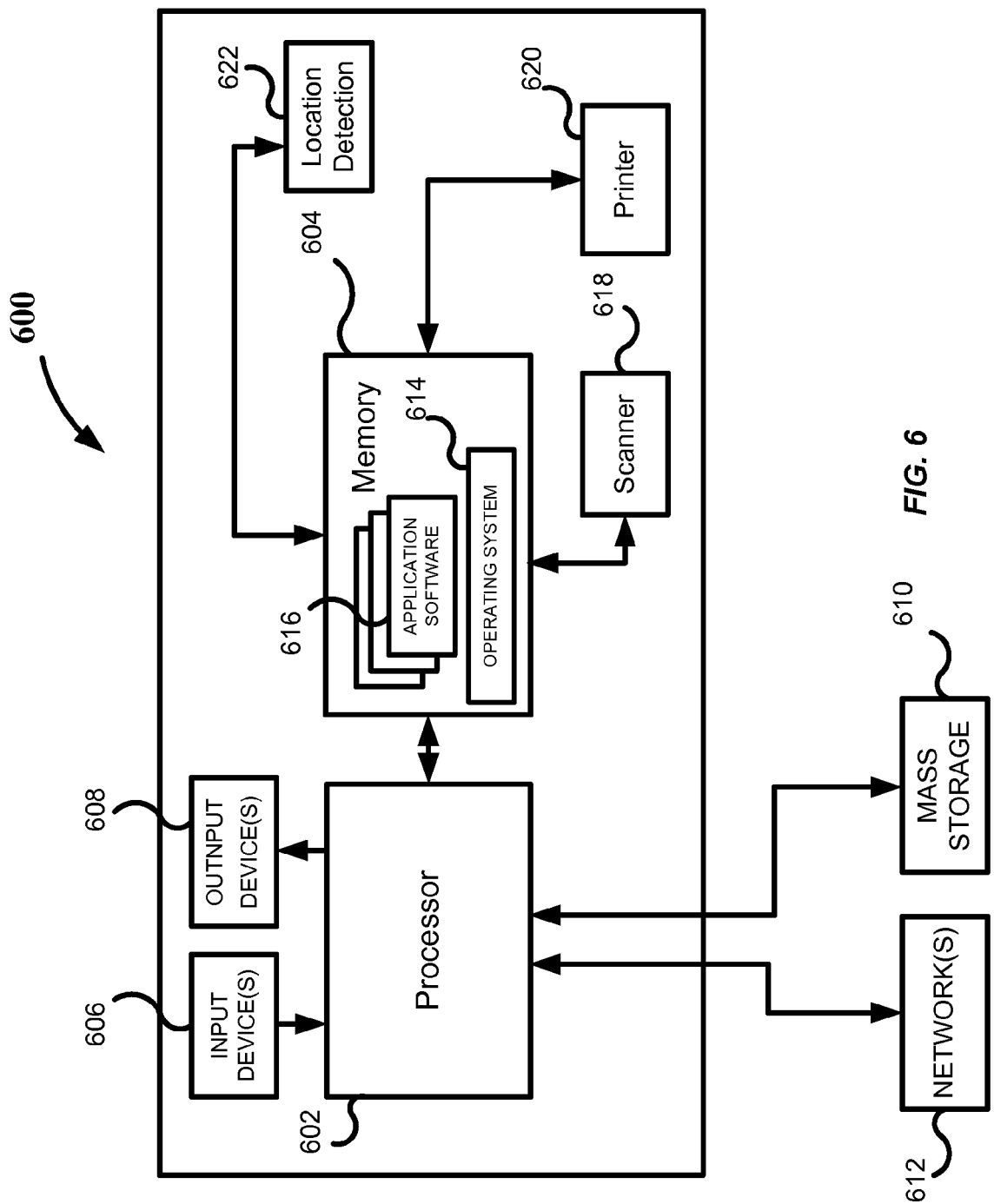
FIG. 6 shows an exemplary hardware device that may be used to implement at least a portion of teachings described herein.

FIG. 6 of the drawings shows an exemplary hardware 600 that may be used to implement the present invention. Referring to FIG. 6, the hardware 600 typically includes at least one processor 602 coupled to a memory 604. The processor 602 may represent one or more processors (e.g. microprocessors), and the memory 604 may represent random access memory (RAM) devices comprising a main storage of the hardware 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, imaging device, scanner, etc.) and a one or more output devices 608 (e.g., a Liquid Crystal Display (LCD) panel, an electronic whiteboard, a touch screen, a sound playback device (speaker).

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, universal serial bus (USB) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc. to implement the techniques described above. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments and implementations have been described and shown in the accompanying drawings, it is to be understood that such embodiments and implementations are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

I claim:

1. A method in a computer system for finding and presenting information, the method comprising:
   acquiring an image of a first copy of a document having original information and one or more first annotations;
   isolating the one or more first annotations of the document;
   performing a semantic evaluation of the one or more isolated first annotations;
   performing a semantic evaluation of the original information;
   creating an association between a portion of the isolated first annotations and one or more portions of the original information;
   performing a semantic search for related information from a corpus of documents using at least one of a portion of the isolated first annotations and a portion of the original information, the corpus of documents including a plurality of historical documents including one or more prior annotations previously made thereto, wherein the semantic search includes comparing a grammatical relationship in the portion of the isolated first annotations or the portion of the original information to the one or more prior annotations included in the plurality of historical documents and to data in the plurality of historical documents;
   identifying related information based at least in part upon the semantic search for related information from the corpus of documents, wherein the related information comprises one or more of the one or more prior annotations previously made to the historical documents and data in one of the historical documents of the plurality of historical documents;
   storing the related information, at least a portion of the created association, at least a portion of the isolated first annotations or at least a portion of the one or more portions of the original information;
   acquiring an image of a second copy of the document having original information and one or more second annotations;
   isolating the one or more second annotations in the second copy of the document;
   performing a semantic evaluation of the isolated second annotations;
   creating an association between a portion of the isolated second annotations and the one or more portions of the original information;
   storing at least a portion of the created association between the portion of the isolated second annotations and one or more portions of the original information;
   retrieving from the document a geolocation identifier for the document, the geolocation identifier indicating a location of the document at the time the document was previously annotated or marked up; and retrieving a geolocation identifier associated with the isolated first annotations and the isolated second annotations.

2. The method of claim 1, wherein performing the semantic evaluation includes:
identifying a relationship search query;
identifying a grammatical relationship between a first entity and at least one of a second entity or an action;
transforming the relationship search query into a boolean expression; and
under control of the computer system, determining a set of data objects that match the boolean expression by searching of a set of information taken from the corpus of documents.

3. The method of claim 1, wherein the method further comprises:
encrypting the isolated first annotations; and
storing original information, the encrypted isolated first annotations, and the created association in a new document.

4. The method of claim 3, wherein the isolated first annotations are encrypted with a first encoding based upon a first user associated with the isolated first annotations, and wherein the isolated second annotations are encrypted with a second, different encoding based upon a second user associated with the isolated second annotations.

5. The method of claim 1, wherein the method further comprises:
identifying a user associated with the isolated first annotations;
identifying a security group for the identified user;
identifying at least one security privilege associated with the security group; and
storing an identifier associated with the user, an identifier associated with the security group and an identifier for each of the security privileges for use with the at least a portion of the created association, at least a portion of the isolated first annotations or at least a portion of the one or more portions of the original information.

6. The method of claim 1, wherein the document includes a document identifier, and wherein the method further comprises:
recognizing the document identifier; and
associating a user with the isolated first annotations added to the document.

7. The method of claim 1, wherein creating the association between the portion of the isolated first annotations and one or more portions of the original information is based at least in part upon a location of an annotation relative to the one or more portions of the original information.

8. The method of claim 1, further comprising:
determining a number of annotations made in each portion of the document based upon at least the isolated first annotations and the isolated second annotations;
displaying the document; and
identifying the number of annotations made to each portion of the document using color in the displayed document.

9. The method of claim 1, wherein performing the semantic search includes:
determining a set of data objects from the at least a portion of the isolated first annotations and the portion of the original information; and
determining, for the set of data objects, semantic information that specifies an entity type that identifies the data object as a type of person, location, or thing, wherein the identifying the related information includes returning an indication of each portion of related information that matches the semantic information.

10. The method of claim 1, wherein acquiring the image of the first copy of the document includes acquiring a semi-unique document identifier, wherein the semi-unique identifier includes information about an identity of a person associated with the isolated first annotations.

11. The method of claim 1, wherein acquiring the image of the first copy of the document includes retrieving a portion of geolocation information, the geolocation information indicating the location of the document at the time the document was previously annotated or marked up, associating the portion of geolocation information with the image of the first copy of the document and with a timestamp associated with the acquiring the image of the first copy of the document.

12. A device for acquiring related information from a corpus of documents, the device comprising:
an optical sensor;
an electronic storage component coupled to the optical sensor;
a processor in communication with the optical sensor and the electronic storage component; and
a memory coupled to the processor and configured with processor-executable instructions which, when executed by the processor, cause the processor to:
acquire with the optical sensor an image of a document having document information and an annotation, wherein the annotation includes annotation markings representative of annotation text;
separate the annotation from the document information;
recognize at least a portion of the annotation markings;
perform a semantic search for related information from the corpus of documents using at least one of a portion of the annotation text derived from the recognized annotation markings and a portion of the document information, the corpus of documents including a plurality of historical documents including one or more prior annotations previously made thereto, wherein the semantic search includes comparing a grammatical relationship in the portion of the annotation text or the portion of the document information to the one or more prior annotations included in the plurality of historical documents and to data in the plurality of historical documents;
identify the related information based at least in part upon the semantic search for related information from the corpus of documents, wherein the related information comprises one or more of the one or more prior annotations previously made to the historical documents and data in one of the historical documents of the plurality of historical documents;
store the related information in the electronic storage component;
encrypt the separated annotation; and
store the document information, the encrypted separated annotation, and the identified related information in a new document,
wherein acquiring with the optical sensor the image of the document having document information and the annotation includes retrieving a portion of geolocation information, the geolocation information indicating a location of the document at the time the document was previously annotated or marked up, and associating the portion of geolocation information with the image of the document and with a timestamp associated with the acquiring with the optical sensor the image of the document.

13. The device of claim 12, wherein performing the semantic search includes:
    determining a set of data objects from the at least one of the portion of the annotation text and the portion of the document information; and
    determining, for the set of data objects, semantic information that specifies an entity type that identifies the data object as a type of person, location, or thing, wherein the identifying the related information includes returning an indication of each portion of related information that matches the semantic information.

14. The device of claim 12, wherein acquiring with the optical sensor the image of the document with the optical sensor includes acquiring a semi-unique document identifier, wherein the semi-unique identifier includes information about an identity of a person associated with the annotation.

15. The device of claim 12, wherein the processor is further configured to:
    encrypt the annotation with a first encoding based upon a first user associated with the annotation;
    acquire a second annotation from the image of the document; and
    encrypt the second annotation with a second, different encoding based upon a second user associated with the second annotation.

16. The device of claim 15, wherein the processor is further configured to:
    determine a number of annotations made in each portion of the document based upon at least the annotation and the second annotation;
    display the document; and
    identify the number of annotations made to each portion of the document using color in the displayed document.

17. One or more physical computer-readable media encoded with instructions that when executed by a computing system cause the computing system to perform operations, the operations comprising:
    acquiring an image of a document that includes document information and a first annotation;
    isolating the first annotation added to the document, wherein the first annotation is associable with a portion of the document information;
    performing a semantic evaluation of the isolated first annotation;
    performing a semantic evaluation of the document information;
    creating an association between a portion of the isolated first annotation and one or more portions of the document information;
    performing a semantic search for related information from a corpus of documents using at least one of a portion of the first annotation and a portion of the document information, the corpus of documents including a plurality of historical documents including one or prior more annotations previously made thereto, wherein the semantic search includes comparing a grammatical relationship in the portion of the first annotation or the portion of the document information to the one or more prior annotations included in the plurality of historical documents and to data in the plurality of historical documents;
    identifying related information based at least in part upon the semantic search for related information from the corpus of documents, wherein the related information comprises one or more of the one or more prior annotations previously made to the historical documents and data in one of the historical documents of the plurality of historical documents;
    storing the related information, at least a portion of the created association, at least a portion of the isolated annotation or at least a portion of the one or more portions of the document information;
    acquiring an image of a second copy of the document having document information;
    isolating a second annotation in the second copy of the document;
    performing a semantic evaluation of the isolated second annotation;
    creating an association between a portion of the isolated second annotation and one or more portions of the document information;
    storing at least a portion of the created association between a portion of the isolated second annotation and one or more portions of the document information;
    retrieving from the document a geolocation identifier for the document, the geolocation identifier indicating a location of the document at the time the document was previously annotated or marked up; and
    retrieving a geolocation identifier associated with the isolated first and second annotations.

18. The one or more physical computer-readable media of claim 17, wherein the acquiring the image of the document includes performing an optical scan of a paper version of a document.

19. The one or more physical computer-readable media of claim 17, wherein the operations further comprise:
    encrypting the isolated first annotation; and
    storing document information, the encrypted isolated first annotation, and the created association in a new document.

20. The one or more physical computer-readable media of claim 17, wherein the document includes a document identifier, wherein the acquiring the image of the document includes acquiring a copy of the document identifier, and wherein the operations further comprise:
    recognizing the document identifier; and
    associating a user with the isolated first annotation added to the document.

21. The one or more physical computer-readable media of claim 17, wherein performing a semantic evaluation includes identifying a grammatical relationship between a first entity and at least one of a second entity or an action.

22. The one or more physical computer-readable media of claim 17, wherein (1) isolating the first annotation added to the document, (2) performing the semantic evaluation of the isolated first annotation, (3) performing the semantic evaluation of the document information, and (4) creating the association between the portion of the isolated first annotation and one or more portions of the document information, are performed in approximate real-time as the annotation is made to the document.

23. The one or more physical computer-readable media of claim 17, wherein the isolated first annotation is encrypted with a first encoding based upon a first user associated with the isolated first annotation, and wherein the isolated second annotation is encrypted with a second, different encoding based upon a second user associated with the isolated second annotation.

24. The one or more physical computer-readable media of claim 17, wherein the operations further comprise:

determining a number of annotations made in each portion of the document based upon at least the isolated first annotation and the isolated second annotation;
displaying the document; and
identifying the number of annotations made to each portion of the document using color in the displayed document.

25. The one or more physical computer-readable media of claim 17, wherein the operations for performing the semantic search includes:
determining a set of data objects from the at least a portion of the isolated first annotation and the portion of the document information; and
determining, for the set of data objects, semantic information that specifies an entity type that identifies the data object as a type of person, location, or thing, wherein the identifying the related information includes returning an indication of each portion of related information that matches the semantic information.

26. A method for acquiring related information from a corpus of documents, the device comprising:
acquiring with an optical sensor an image of a document having document information and an annotation, wherein the annotation includes annotation markings representative of annotation text;
separating the annotation from the document information;
recognizing at least a portion of the annotation markings;
performing, using a processor, a semantic search for related information from the corpus of documents using at least one of a portion of the annotation text derived from the annotation markings and a portion of the document information, the corpus of documents including a plurality of historical documents including one or more prior annotations previously made thereto, wherein the semantic search includes comparing a grammatical relationship in the portion of the annotation text or the portion of the document information to the one or more prior annotations included in the plurality of historical documents and to data in the plurality of historical documents;
identifying the related information based at least in part upon the semantic search for related information from the corpus of documents, wherein the related information comprises one or more of the one or more prior annotations previously made to the historical documents and data in one of the historical documents of the plurality of historical documents;
storing the related information in the electronic storage component;
encrypting the separated annotation; and
storing the document information, the encrypted separated annotation, and the identified related information in a new document,
wherein acquiring with the optical sensor the image of the document having document information and the annotation includes retrieving a portion of geolocation information, the geolocation information indicating a location of the document at the time the document was previously annotated or marked up, and associating the portion of geolocation information with the image of the document and with a timestamp associated with the acquiring with the optical sensor the image of the document.

27. The method of claim 26, wherein performing the semantic search includes:
determining a set of data objects from the at least one of the portion of the annotation text and the portion of the document information; and
determining, for the set of data objects, semantic information that specifies an entity type that identifies the data object as a type of person, location, or thing, wherein the identifying the related information includes returning an indication of each portion of related information that matches the semantic information.

28. The method of claim 26, wherein acquiring with the optical sensor the image of the document with the optical sensor includes acquiring a semi-unique document identifier, wherein the semi-unique identifier includes information about an identity of a person associated with the annotation.

29. The method of claim 26, further comprising:
encrypting the annotation with a first encoding based upon a first user associated with the annotation;
acquiring a second annotation from the image of the document; and
encrypting the second annotation with a second, different encoding based upon a second user associated with the second annotation.

30. The method of claim 29, further comprising:
determining a number of annotations made in each portion of the document based upon at least the annotation and the second annotation;
displaying the document; and
identifying the number of annotations made to each portion of the document using color in the displayed document.

* * * * *